United States Patent
Nakatsu

(10) Patent No.: US 9,475,404 B2
(45) Date of Patent: Oct. 25, 2016

(54) WHEEL CONTROL DEVICE, VEHICLE, WHEEL CONTROL METHOD

(71) Applicant: Masatoshi Nakatsu, Susono (JP)

(72) Inventor: Masatoshi Nakatsu, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/428,423

(22) PCT Filed: Oct. 10, 2012

(86) PCT No.: PCT/JP2012/076191
§ 371 (c)(1),
(2) Date: Mar. 16, 2015

(87) PCT Pub. No.: WO2014/057537
PCT Pub. Date: Apr. 17, 2014

(65) Prior Publication Data
US 2015/0298575 A1    Oct. 22, 2015

(51) Int. Cl.
*B60L 9/00*    (2006.01)
*B60L 15/20*    (2006.01)

(52) U.S. Cl.
CPC ............ *B60L 15/2045* (2013.01); *B60L 15/20* (2013.01); *B60L 2220/42* (2013.01); *B60L 2220/44* (2013.01); *B60L 2220/46* (2013.01); *B60L 2240/423* (2013.01); *B60L 2240/645* (2013.01); *B60L 2240/647* (2013.01); *B60L 2260/28* (2013.01); *B60L 2270/145* (2013.01); *Y02T 10/645* (2013.01); *Y02T 10/648* (2013.01); *Y02T 10/7283* (2013.01); *Y02T 10/7291* (2013.01); *Y02T 90/16* (2013.01)

(58) Field of Classification Search
USPC .......................................................... 701/22
See application file for complete search history.

(56) References Cited

U.S. PATENT DOCUMENTS 5,089,966 A * 2/1992 Fukushima .......... B60G 17/018
                                                    280/124.108
6,345,223 B1 * 2/2002 Takizawa .............. B60T 8/3215
                                                    477/166

(Continued)

FOREIGN PATENT DOCUMENTS

JP        8-182119 A        7/1996
JP        2005-20831 A      1/2005

(Continued)

OTHER PUBLICATIONS

International Search Report of PCT/JP2012/076191, dated Jan. 22, 2013. [PCT/ISA/210].

*Primary Examiner* — Thomas G Black
*Assistant Examiner* — Tyler Paige
(74) *Attorney, Agent, or Firm* — Sughrue Mion, PLLC

(57) ABSTRACT

A wheel control device configured to control a plurality of wheels (11-14) mounted on a vehicle (10) includes a controller (110) configured to perform feedback control of a motor (21-24), which is mounted to each of the plurality of wheels (11-14) in order to drive the each of the plurality of wheels, so that a driving torque of the motor follows a target torque. The controller (110) reduces, for a motor driving a subject wheel that has received a predetermined road surface input among the plurality of wheels (11-14), a feedback amount relating to the feedback control to be less than a feedback amount before the subject wheel receives the road surface input.

19 Claims, 8 Drawing Sheets

(56) References Cited

U.S. PATENT DOCUMENTS

| | | | |
|---|---|---|---|
| 2008/0249690 A1* | 10/2008 | Matsumoto | B60W 10/06 701/48 |
| 2009/0000857 A1* | 1/2009 | Sugiyama | B62D 5/0472 180/444 |
| 2010/0204881 A1* | 8/2010 | Muragishi | F16F 7/1005 701/36 |
| 2010/0241305 A1* | 9/2010 | Itabashi | B60G 17/016 701/29.2 |
| 2013/0245888 A1* | 9/2013 | Kikuchi | B60G 17/0195 701/38 |

FOREIGN PATENT DOCUMENTS

| | | |
|---|---|---|
| JP | 2006-60913 A | 3/2006 |
| JP | 2006-129542 A | 5/2006 |
| JP | 2008-172935 A | 7/2008 |
| JP | 2009-127456 A | 6/2009 |
| WO | 2012/029133 A1 | 3/2012 |

* cited by examiner

WHEEL CONTROL DEVICE, VEHICLE, WHEEL CONTROL METHOD

CROSS REFERENCE TO RELATED APPLICATIONS

This application is a National Stage of International Application No. PCT/JP2012/076191 filed Oct. 10, 2012, the contents of all of which are incorporated herein by reference in their entirety.

TECHNICAL FIELD

The present invention relates to a technology of controlling wheels mounted on a vehicle.

BACKGROUND ART

Patent Literature 1 discloses a feedback control of adjusting, on a vehicle on which a motor (in-wheel motor) for driving a wheel is incorporated into the wheel, a driving torque of the motor to carry out vibration suppression. This feedback control has a potential of precisely controlling a driving force of the motor by controlling a current value of the motor to follow a target current value.

CITATION LIST

Patent Literature

[PTL 1] JP 2006-060913 A

SUMMARY OF INVENTION

Incidentally, when a road surface input (disturbance) particularly in a high frequency band acts on the wheel on a vehicle of this type on which the motor is incorporated into the wheel, a rotor side member of the motor is oscillated by the road surface input to generate an induced voltage. As a result, a current of the motor varies. In this case, when the above-mentioned feedback control is carried out, if constraints are imposed on a calculation period and a calculation speed for the control, a driving torque that may be generated, and the like, the control may not be appropriately carried out. In the feedback control in which the current value of the motor is controlled to follow the target current value, a rotational rigidity of the rotor side member of the motor increases, and a reaction force is thus generated on a stator side member. As a result, such a problem arises that a road surface input to the vehicle increases. In other words, if a following property of the feedback control is limited, there is a fear in that a rigidity of a drive system excessively increases relative to the road surface input in the high frequency band to the wheel, and an attenuation rate of a vibration caused by the road surface input decreases. On the other hand, if the feedback control is not carried out, the original purpose of precisely controlling the driving force of the motor may not be accomplished. Moreover, when a variation in the driving torque of the motor is large during the feedback control, such a phenomenon that the sign of this driving torque is inverted (so-called "zero cross of torque") occurs. In this case, for example, on a vehicle including a speed reducer between the wheel and the motor, a problem of generation of a rattle and a vibration in the speed reducer occurs.

Moreover, even when technologies disclosed in reference literatures (JP 2005-020831 A and JP 2006-129542 A) are applied to a rattling control subject, it is difficult to appropriately control the control subject.

The present invention has been made in view of the above-mentioned problems, and therefore has an object to provide a technology of, on a vehicle on which a motor for driving a wheel is incorporated into the wheel, appropriately controlling the motor in response to a road surface input in a predetermined high frequency band to the wheel.

In order to achieve the above-mentioned object, a wheel control device according to one embodiment of the present invention is a device configured to control a plurality of wheels mounted on a vehicle, and includes at least a control part. The control part provides a function of performing feedback control of a motor, which is mounted to each of the plurality of wheels to drive the each of the plurality of wheels, so that a driving torque of the motor follows a target torque. Moreover, the control part provides a function of reducing, for a motor driving a subject wheel that has received a predetermined road surface input among the plurality of wheels, a feedback amount (also referred to as "feedback gain") relating to the feedback control to be less than a feedback amount before the subject wheel receives the road surface input. In this case, as the predetermined road surface input, a disturbance in a high frequency band more than 10 Hz is typically exemplified. Moreover, the reduction in the feedback amount includes a wide range of forms of relatively reducing the feedback amount. As a result, an effect of the feedback control is suppressed. Consequently, a transmission of a vibration to the stator side member (such as a motor housing) of the motor is suppressed by a reduction in the electrical rigidity, which may suppress a vibration of the vehicle caused by kickback.

It is preferred that the wheel control device according to one embodiment of the present invention include an information detection part capable of detecting variation information, which has been obtained when each of the plurality of wheels receives the road surface input. In this case, as the variation information, an unsprung mass acceleration acting on an unsprung mass area of the vehicle and a rotational variation of the motor are typically exemplified. Then, it is preferred that the control part identify the subject wheel based on the variation information detected by the information detection part, and, when the subject wheel receives the road surface input, reduce the feedback amount relating to the feedback control to be less than the feedback amount before the subject wheel receives the road surface input. As a result, the feedback amount relating to the feedback control may effectively be reduced for the motor for the subject wheel based on the variation information detected by the information detection part.

In the wheel control device according to one embodiment of the present invention, it is preferred that the information detection part include an acceleration sensor mounted to each of the plurality of wheels in order to detect an unsprung mass acceleration acting on an unsprung mass area of the vehicle. Further, it is preferred that the control part determine a wheel for which an unsprung mass acceleration more than a threshold set in advance is detected by the acceleration sensor as the subject wheel. As a result, the feedback amount relating to the feedback control may effectively be reduced for the motor for the subject wheel based on the unsprung mass acceleration detected by the acceleration sensor.

In the wheel control device according to one embodiment of the present invention, it is preferred that the information detection part include a motor rotation sensor configured to detect a rotational variation of the motor. Further, it is preferred that the control part determine a wheel corresponding to a motor for which the rotational variation more than a threshold set in advance is detected by the motor rotation sensor as the subject wheel. As a result, the feedback amount relating to the feedback control may effectively be reduced for the motor for the subject wheel based on the rotational variation detected by the motor rotation sensor.

In the wheel control device according to one embodiment of the present invention, it is preferred that the control part change the feedback amount from a first gain to a second gain that is less than the first gain in order to reduce the feedback amount relating to the feedback control to be less than the feedback amount before the subject wheel receives the road surface input. As a result, the feedback amount of the motor for the subject wheel may be reduced from the first gain to the second gain.

In the wheel control device according to one embodiment of the present invention, it is preferred that a proportional gain serving as the second gain be zero. As a result, the effect of reducing the feedback amount may be increased by setting the proportional gain, which has a particularly large influence by its change among the feedback amount, to be zero.

In the wheel control device according to one embodiment of the present invention, it is preferred that the second gain be zero. As a result, the feedback amount of the motor for the subject wheel may be reduced by setting the second gain to be zero.

In the wheel control device according to one embodiment of the present invention, it is preferred that, after the feedback amount relating to the feedback control is changed from the first gain to the second gain, the control part return the feedback amount from the second gain to the first gain again when a predetermined period has elapsed. In this case, typically, it is preferred that the predetermined period relating to the reduction in the feedback amount be such a short period (such as 0.1 to 0.3 [s]) that does not affect vehicle motions (such as an acceleration in a longitudinal direction of the vehicle, an acceleration in a lateral direction, and a yaw rate). As a result, while the vibration of the vehicle caused by the kickback is suppressed, the driving force of the wheel is prevented from varying by the reduction in the feedback amount to affect the vehicle motion.

In the wheel control device according to one embodiment of the present invention, it is preferred that the control part carry out motor control so that a period required for returning the feedback amount from the second gain to the first gain is more than a period required for changing the feedback amount from the first gain to the second gain. In other words, when the feedback amount of the feedback control is returned to the feedback amount before the reduction, this return operation is gently carried out. As a result, while the effect of reducing the feedback amount may be quickly acquired, generation of a noise and a vibration may be suppressed when the feedback amount is returned to that before the reduction.

In the wheel control device according to one embodiment of the present invention, it is preferred that, in order to reduce the feedback amount relating to the feedback control to be less than the feedback amount before the subject wheel receives the road surface input, the control part reduce a feedback amount in a predetermined high frequency band out of the feedback amount depending on an amplitude of the road surface input. As a result, when the amplitude of the road surface input in the predetermined high frequency band reaches a certain level, a high frequency component of an actual current value supplied to the motor for the subject wheel may be attenuated. As a result, the transmission of the vibration to the stator side member (such as the motor housing) of the motor is suppressed. Consequently, the vibration of the vehicle caused by the kickback may be suppressed.

In the wheel control device according to one embodiment of the present invention, it is preferred that the control part assign a torque error amount (deviation amount) generated by the reduction in the feedback amount to a target torque of another motor other than the motor relating to the reduction, and perform feedback control of the another motor depending on the target torque after the assignment. In other words, the torque error amount of the predetermined motor is compensated for by the another motor. For example, when the torque decreases due to the reduction in the feedback amount, the decreased amount in the torque may be added to the target torque of the another motor, and when the torque increases due to the reduction in the feedback amount, the increased amount in the torque may be subtracted from the target torque of the another motor. In this case, the error amount of the driving torque is an error (torque error $\Delta T$) relating to a torque precision generated by the reduction in the feedback amount. As a result, changes generated in the vehicle motions may be suppressed to reduce a sense of discomfort felt by vehicle occupants.

In the wheel control device according to one embodiment of the present invention, it is preferred that the control part carry out motor control so that a period required for assigning the torque error amount to the target torque of the another motor is more than a period required for reducing the feedback amount. As a result, while the effect of reducing the feedback amount may be quickly acquired for the motor for the subject wheel, generation of a noise and a vibration caused by the rapid distribution of the torque error on another motor other than the motor for the subject wheel may be suppressed.

In the wheel control device according to one embodiment of the present invention, it is preferred that the torque error to be assigned to another motor be a predetermined low frequency component of the driving torque generated by the reduction in the feedback amount. As a result, while the effect of reducing the feedback amount may be quickly acquired for the motor for the subject wheel, the generation of the noise and the vibration caused by the rapid distribution of the torque error on another motor other than the motor for the subject wheel may be suppressed.

In the wheel control device according to one embodiment of the present invention, it is preferred that the control part offset the target torque so as to increase a difference between the target torque and a torque zero area in which a sign of the driving torque of the motor is inverted before the reduction in the feedback amount relating to the feedback control. As a result, in subsequent feedback amount reduction processing, the control of following the target torque is carried out on the motor for the subject wheel. Thus, even if an actual driving torque varies due to the feedback amount reduction processing, the fear of the inversion of the sign of the driving torque (generation of the zero cross) decreases. As a result, on a vehicle on which a speed reducer is interposed between the wheel and the motor, generation of a rattle and a vibration in the speed reducer may be suppressed.

In the wheel control device according to one embodiment of the present invention, it is preferred that the control part assign a torque change amount generated by the offset of the target torque to a target torque of another motor other than the motor relating to the offset, and perform feedback control of the another motor depending on the target torque after the assignment. In other words, the torque change amount of the predetermined motor is compensated for by the another motor. For example, when the target torque of the predetermined motor is offset toward an increase direction (in a case of an offset toward a plus side), the torque change amount relating to the offset may be subtracted from the target torque of the another motor, and when the target torque of the predetermined motor is offset toward a decrease direction (in a case of an offset toward a minus side), the torque change amount relating to the offset may be added to the target torque of the another motor. As a result, variations in the vehicle motions and the travel speed of the vehicle may be suppressed.

In the wheel control device according to one embodiment of the present invention, it is preferred that the control part set a period from a passage of a front wheel among the plurality of wheels on a traveling road surface relating to the road surface input to a passage of a rear wheel to be a holding period for holding the offset. As a result, the use of an unnecessary driving torque (consumption of unnecessary energy) may be prevented by suppressing the period during which the offset state is maintained.

In the wheel control device according to one embodiment of the present invention, it is preferred that, when the offset causes an equilibrium state in which a torque in a driving direction is generated on any one of a front wheel and a rear wheel among the plurality of wheels and a torque in a braking direction opposite to the driving direction is generated on another one of the front wheel and the rear wheel, the control part hold the equilibrium state for a certain period. Appropriate offset processing in a stable state in which the torque is balanced between the plus side and the minus side may be carried out by holding the equilibrium state for a certain period.

In the wheel control device according to one embodiment of the present invention, it is preferred that the control part carry out motor control so that a period required for assigning the torque change amount to the target torque of the another motor is more than a period required for the offset. As a result, while a noise and a vibration caused by the zero cross on the subject wheel relating to the road surface input are reduced, a noise and a vibration caused by rapid torque redistribution processing may be suppressed.

In the wheel control device according to one embodiment of the present invention, it is preferred that, when a control state in which the feedback control is performed on the another motor depending on the target torque after the assignment of the torque change amount is formed from an initial state after the offset and when the control state is returned to the initial state, the control part carry out motor control so that a period required for a transition from the control state to the initial state is more than a period required for a transition from the initial state to the control state. As a result, a noise and a vibration, which are caused when the control state returns to the initial state, may be suppressed.

A vehicle according to one embodiment of the present invention includes: a plurality of wheels; a motor mounted to each of the plurality of wheels in order to drive the each of the plurality of wheels; and a control device configured to control the motor. The control device includes the above-mentioned wheel control device. As a result, a vehicle effective for suppressing the vibration caused by the kickback, which is generated when the wheel receives the road surface input may be constructed.

A wheel control method according to one embodiment of the present invention is a method of controlling a motor, which is mounted to each of a plurality of wheels in order to drive the each of the plurality of wheels, so that a driving torque of the motor follows a target torque. With this wheel control method, for a motor driving a subject wheel that has received a road surface input among the plurality of wheels, a feedback amount relating to the feedback control is reduced to be less than a feedback amount before the subject wheel receives the road surface input. As a result, an effect of the feedback control is suppressed. Consequently, the transmission of the vibration to the stator side member (such as the motor housing) of the motor is suppressed by a reduction in the electrical rigidity. Consequently, the vibration of the vehicle caused by the kickback may be suppressed.

In the wheel control method according to one embodiment of the present invention, it is preferred to: detect variation information, which is obtained when each of the plurality of wheels receives the road surface input; identify the subject wheel based on the detected variation information; and reduce, when the subject wheel receives the road surface input, the feedback amount relating to the feedback control to be less than the feedback amount before the subject wheel receives the road surface input. As a result, the feedback amount relating to the feedback control may effectively be reduced for the subject wheel based on the variation information detected by the information detection part.

DESCRIPTION OF EMBODIMENTS

Figure 1:
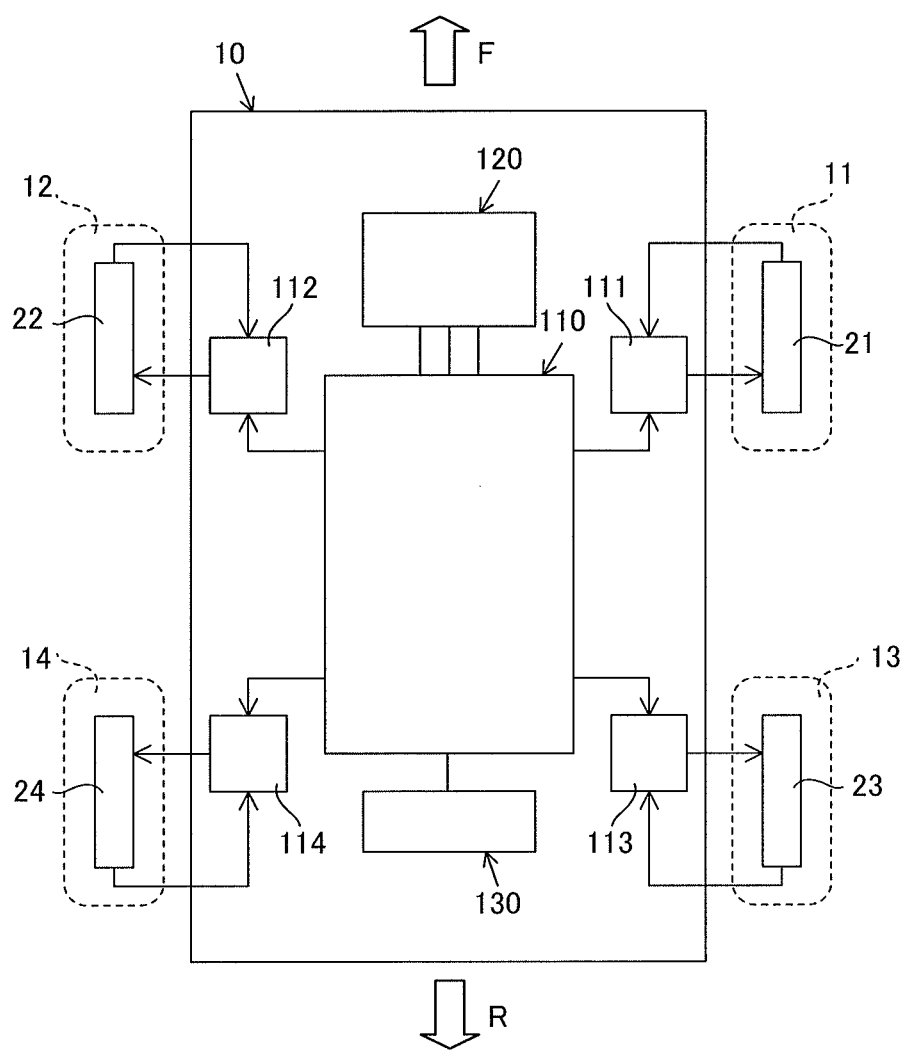
FIG. 1 is a diagram illustrating a schematic configuration of a drive mechanism of a vehicle 10 according to the present invention.

A description is now given of a vehicle 10 according to an embodiment of the present invention referring to the drawings.

FIG. 1 illustrates a schematic configuration of a drive mechanism of the vehicle 10. The arrow F of FIG. 1 represents a forward direction of the vehicle 10, and the arrow R represents a backward direction of the vehicle 10. The vehicle 10 corresponds to "vehicle" according to the present invention, and includes four wheels (each of which is an entirety of a rotational part including a soft tire) 11 to 14, four motors (also referred to as "in-wheel motors") 21 to 24, a controller 110, four motor drive parts 111 to 114, an information detection part 120, and acceleration sensors 130. Moreover, all of the controller 110, the four motor drive parts 111 to 114, the information detection part 120, and the acceleration sensors 130 are components for controlling the four wheels 11 to 14 and the four motors 21 to 24, and serve as "wheel drive device" and "control part" of the present invention. In this case, the four motors 21 to 24 may further be considered as the components.

The first motor 21 is incorporated into the front right wheel 11 as the wheel, and rotationally drives the front right wheel 11 by using driving electric power in three phases supplied from the motor drive part 111. The second motor 22 is incorporated into the front left wheel 12 as the wheel, and rotationally drives the front left wheel 12 by using driving electric power in three phases supplied from the motor drive part 112. The third motor 23 is incorporated into the rear right wheel 13 as the wheel, and rotationally drives the rear right wheel 13 by using driving electric power in three phases supplied from the motor drive part 113. The fourth motor 24 is incorporated into the rear left wheel 14 as the wheel, and rotationally drives the rear left wheel 14 by using driving electric power in three phases supplied from the motor drive part 114.

Each of those four motors 21 to 24 is constructed as a three-phase AC induction motor including a rotor (typically, a rotational shaft) serving as a rotor rotating together with the corresponding wheel, and a stator (typically, a motor housing) serving as a stator fixed to the body. Moreover, in the vehicle 10, a speed reducer (speed reducer 31 to be described later) is interposed between each of the four motors 21 to 24 and the corresponding wheel, and, thus, such a structure that the torque is increased/decreased via the speed reducer (so-called "gear reduction type") is employed. On the other hand, such a structure that each of the four motors 21 to 24 and the corresponding wheel are directly connected with each other (so-called "direct drive type") may be employed depending on necessity.

The controller 110 is connected to each of the motor drive parts in order to control the motor drive parts 111 to 114. The controller 110 is constructed of a microcomputer including a CPU, a ROM, a RAM, and the like as principal components.

The information detection part 120 is connected to the controller 110 via well-known controller area network (CAN) communication. Detection values (such as an accelerator opening degree and a vehicle speed) detected by various sensors are input to the information detection part 120. The input detection values are transmitted to the controller 110 via the CAN communication. The information detection part 120 corresponds to "information detection part" according to the present invention.

The acceleration sensor 130 is connected to the controller 110. The acceleration sensor 130 is constructed as a sensor for detecting an acceleration (typically, an unsprung mass acceleration) acting on the unsprung mass of the vehicle 10. According to this embodiment, the acceleration sensor 130 is mounted to each of the four wheels 11 to 14. Note that, the acceleration sensor 130 may be a component provided independently of the information detection part 120, or may be included in the information detection part 120. The acceleration sensor 130 corresponds to "acceleration sensor" according to the present invention.

In this case, the controller 110 calculates a requested torque Tr for the motor drive parts 111 to 114 based on the detection value transmitted from the information detection part 120, and outputs the requested torque Tr to each of the motor drive parts 111 to 114. It is preferred that the requested torque Tr be output as a current value for the motor driven by each of the motor drive parts. As a result, the controller 110 may perform feedforward control of the respective motors 11 to 14 via the motor drive parts 111 to 114. As a result, the appropriate driving torques are distributed respectively to the four wheels 11 to 14, resulting in formation of desired vehicle motions of the vehicle 10.

The following description is given of a case in which the controller 110 mainly controls the motor 21 by using the motor drive part 111 for the sake of description. On the other hand, the controller 110 is also connected to the other motor drive parts 112 to 114, and may appropriately control the motors 22 to 24 corresponding to the motor drive parts in the same way as the motor 21.

Figure 2:
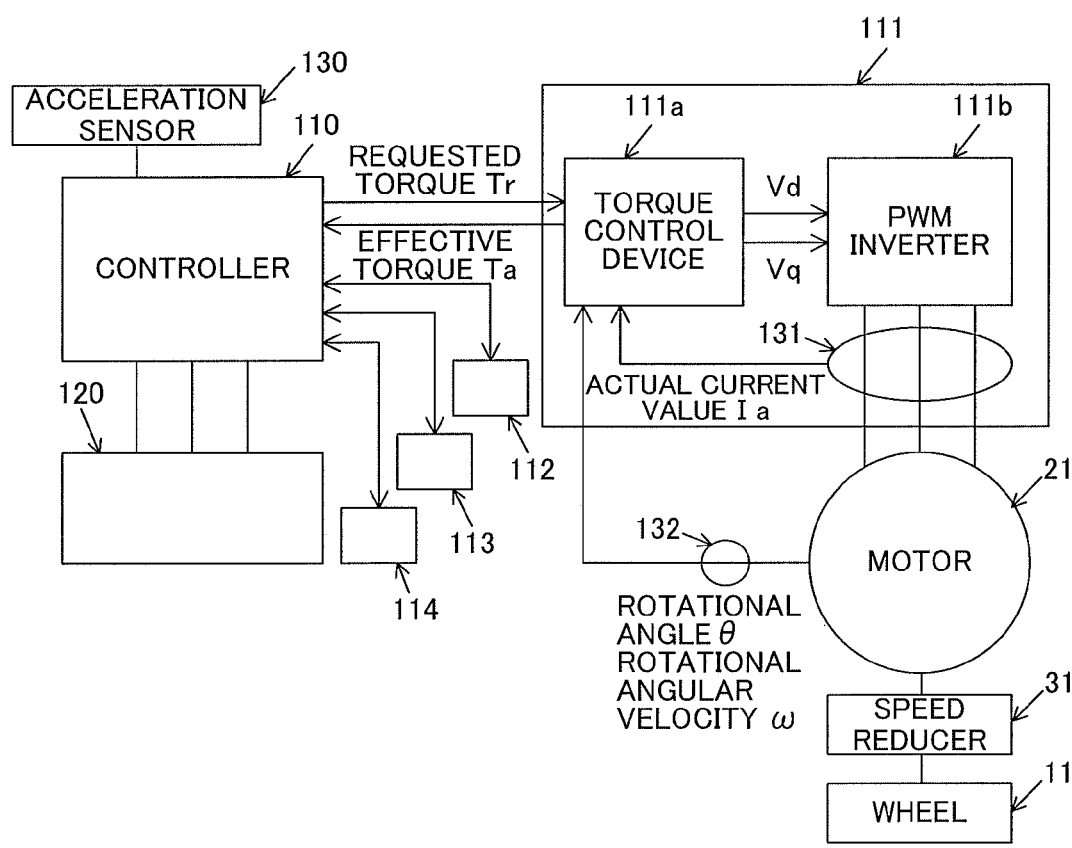
FIG. 2 is a diagram illustrating a control system for using a motor drive part 111 of FIG. 1 to control a motor 21.

FIG. 2 illustrates a control system for controlling the motor 21 by using the motor drive part 111. As illustrated in FIG. 2, the motor drive part 111 includes a torque control device 111a and a PWM inverter 111b. In the motor drive part 111, a current sensor 131 and a motor rotation sensor 132 are each electrically connected to the torque control device 111a. The current sensor 131 is constructed as an information detection sensor for detecting a current value actually supplied to each of the phases of the motor 21, namely, an actual current value Ia (also simply referred to as "current value") of the motor 21. The motor rotation sensor 132 is constructed as an information detection sensor for detecting a rotational angle θ and a rotational angular acceleration ω of the motor 21. The motor rotation sensor 132 may be used to detect a rotational variation of the motor 21. While the torque control device 111a transmits an effective torque Ta corresponding to the actual current value Ia of the motor 21 to the controller 110, the torque control device 111a acquires the requested torque Tr from the controller 110.

Then, the motor drive part 111 calculates a voltage command value V (a d-axis (magnetic flux component) voltage command value: Vd and a q-axis (torque component) voltage command value: Vq) based on the detection values from the current sensor 131 and the motor rotation sensor 132 and the requested torque Tr from the controller 110, and outputs the calculated voltage command value V to the PWM inverter 111b. In this case, the motor drive part 111 includes voltage command calculation means for calculating the voltage command value V. The PWM inverter 111b is an inverter of the well-known pulse width modulation type, which provides control of increasing/decreasing a period during which a pulse signal is output (pulse width), and modulates the voltage command value V output from the torque control device 111a. As a result, a drive voltage is generated in each of the phases of the motor 21, and a drive current is supplied to each of the phases of the motor 21. The motor 21 is driven by the drive current, and, as a result, the wheel 11 is rotationally driven via the speed reducer 31.

In the motor drive part 111, the driving torque of the wheel 11 is adjusted by feedback control (hereinafter also referred to as "current feedback control") of the current supplied to the motor 21 by the controller 110. In the current feedback control, such a control (PID control) that the actual current Ia detected by the current sensor 131 follows the requested torque Tr (requested current value Ir) acquired from the controller 110 is typically carried out.

Specifically, the voltage command value V is calculated by adding a proportional component acquired by multiplying a deviation ΔI between the requested current value Ir and the actual current value Ia by a proportional gain Kp, an integral component acquired by multiplying an integrated value of the deviation ΔI by an integral gain Ki, and a derivative component acquired by multiplying a differentiated value of the deviation ΔI by a derivative gain Kd. In this case, the proportional gain Kp, the integral gain Ki, and the derivative gain Kd serve as a feedback amount (feedback gain) of this current feedback control. As a result, the motor control is carried out so that the drive current supplied to each phase of the motor 21 reaches the target current value, and the driving torque of the motor 21 may be precisely controlled. Note that, P control of calculating the voltage command value V based only on the proportional component and PI control of calculating the voltage command value V based on the proportional component and the integral component may be employed in addition to the PID control depending on necessity.

Incidentally, it is assumed that, in the vehicle 10 having the above-mentioned configuration, the wheels 11 to 14 receive a road surface input (disturbance) in a predetermined high frequency band (typically, a frequency band more than 10 Hz). On this occasion, for example, when the wheel 11 receives the above-mentioned road surface input, in the motor 21 corresponding to this wheel 11, a rotor side member (typically, a motor shaft) rotating together with the wheel 11 is oscillated to generate an induced voltage, resulting in the variation of the current of the motor 21. When the above-mentioned feedback control is carried out in this case, if constraints are imposed on a calculation period and a calculation speed for the control, the driving torque that may be generated, and the like, the control may not be appropriately carried out. For example, when the current value supplied to the motor 21 is controlled to follow the target current value, a rotational rigidity (also referred to as "electrical rigidity") of the rotor side member increases, and a reaction force is generated on a stator side member (typically, the motor housing). As a result, a problem of an increase in the road surface input to the vehicle 10 occurs, which decreases an attenuation rate of a vibration caused by the road surface input. Specifically, if a body part located above suspensions of the vehicle 10 is considered as a sprung mass, and axle parts located below the suspensions of the vehicle 10 are considered as an unsprung mass, an attenuation rate of a vertical vibration of the unsprung mass decreases.

Figure 3:
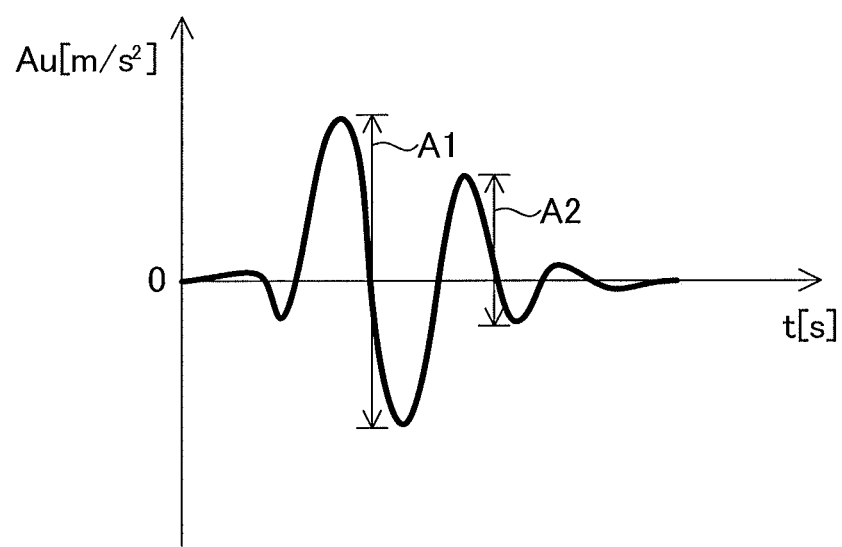
FIG. 3 is a graph schematically showing a state of an attenuation of a vertical vibration of an unsprung mass of the vehicle 10 during feedback control.

A schematic graph of FIG. 3 shows the attenuation of the vertical vibration of the unsprung mass of the vehicle 10 during the current feedback control. FIG. 3 shows an example in which an unsprung mass acceleration Au [m/s$^2$] transitions as time t [s] elapses. In this case, if a ratio of a variation difference (A1−A2) between before and after the attenuation to a variation width A1 of the acceleration (unspring mass acceleration) acting on the unsprung mass is set as the attenuation rate (=(A1−A2)/A1), the attenuation rate in the drive state of the motor 21 may be less than that in a non-drive state. In contrast, if the above-mentioned current feedback control is not carried out, the driving torque is not restricted by this control, and, consequently, the vibration caused by the road surface input in the high frequency band is absorbed, for example, by a motion in the rotational direction of the wheel 11. On the other hand, if the above-mentioned feedback control is not carried out, the original purpose of precisely controlling the driving force of the motor 21 may not be attained. Thus, the feature of the present invention resides in that feedback suppression control to be described below is additionally carried out in order to cope with the road surface input in the high frequency band received by the wheel on the assumption that the above-mentioned current feedback control is carried out.

(First Embodiment)

Figure 4:
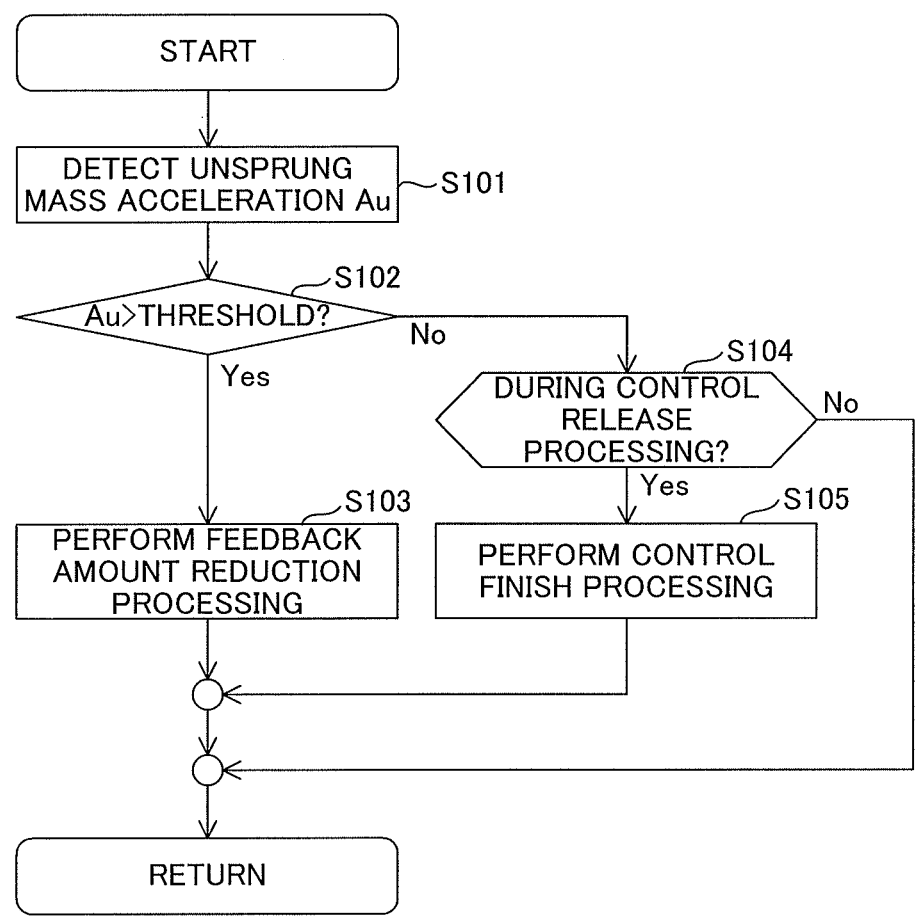
FIG. 4 is a flowchart illustrating a processing flow of feedback suppression control.

FIG. 4 illustrates a processing flow of the feedback suppression control. The feedback suppression control is control of suppressing (reducing) an increase in the electrical rigidity by suppressing an effect of the above-mentioned current feedback control, and includes processing from Step S101 to Step S105.

In the processing in Step S101, the controller 110 detects and stores the unsprung mass acceleration Au [m/s$^2$] acting in correspondence to each of the wheels 11 to 14 of the vehicle 10 continuously or at a certain interval by using each of the acceleration sensors 130. As a result, the unsprung mass acceleration Au corresponding to each wheel is acquired.

In the processing in Step S102, the controller 110 reads the unsprung mass accelerations Au detected in Step S101, and compares the unsprung mass accelerations Au with a threshold set in advance. As a result, when the controller 110 determines that the unsprung mass acceleration Au is more than the threshold (Yes in Step S102), the controller 110 proceeds to Step S103. In this case, it is determined that at least one of the four wheels 11 to 14 has received a road surface input more than a certain level from the road surface. On the other hand, when the controller 110 determines that the unsprung mass accelerations Au detected in Step S101 are less than the threshold (No in Step S102), the controller 110 proceeds to Step S104. In this case, it is determined that none of the four wheels 11 to 14 has received a road surface input more than the certain level from the road surface.

This acceleration sensor 130 may detect variation information, which is obtained when the wheel receives the road surface input. The motor rotation sensor 132 mounted to each of the motors 21 to 24 may be employed as means for detecting this variation information. For example, the wheel corresponding to the motor on which a rotational variation more than a preset threshold is detected by the motor rotation sensor 132 may be determined to have received a road surface input more than the certain level. The motor rotation sensor 132 in this case corresponds to "motor rotation sensor" according to the present invention.

In the processing in Step S104, whether or not processing of releasing the feedback suppression control is being carried out is determined. When the condition in Step S104 is satisfied, processing of finishing the control is carried out in Step S105, or when the condition in Step S104 is not satisfied, the feedback suppression control is finished without any further processing.

In the processing in Step S103, the controller 110 carries out feedback amount reduction processing for a motor for a wheel (hereinafter also referred to as "subject wheel") that has received a road surface input more than the certain level (such as the motor 12 for the wheel 11) out of the four wheels 11 to 14. This feedback amount reduction processing is processing of reducing the feedback amount of the current feedback control, and, specifically, any one of the following three forms (first to third processing forms) may be selectively employed. Note that, "the reduction in the feedback amount" in this specification includes a form of relatively reducing the feedback amount as well as a form of setting the feedback amount to zero.

In the first processing form, when the condition in Step S102 is satisfied, the controller 110 sets the feedback amount of the subject wheel to be relatively smaller than that during the feedback control. In the first processing form, the effect of reducing the feedback amount may be positively acquired on the motor for the subject wheel.

For example, in the case of the PID control, the controller 110 may set the feedback amount (Kp, Ki, and Kd) acquired by summing the proportional component, the integral component, and the derivative component to be smaller than that during the PID control. In this case, calculation means of the controller 110 stores a map M1 in which the feedback amount (Kp, Ki, and Kd) for the PID control and the unsprung mass acceleration Au are associated with each other, and this map M1 may be used to set a new feedback amount. As an example, a feedback amount corresponding to the detected unsprung mass acceleration Au is derived from the map M1, and the feedback amount during the PID control may be changed to the feedback amount derived from the map M1. Moreover, as an example of the change, a feedback amount acquired by subtracting a constant value set in advance from the feedback amount during the PID control may newly be employed.

Further, for example, in the case of the PI control, the controller 110 may set the feedback amount (Kp and Ki) acquired by summing the proportional component and the integral component to be smaller than that during the PI control. In this case, calculation means of the controller 110 stores a map M2 in which the feedback amount (Kp and Ki) for the PI control and the unsprung mass acceleration Au are associated with each other, and this map M2 may be used to set a new feedback amount. As an example, a feedback amount corresponding to the detected unsprung mass acceleration Au is derived from the map M2, and the feedback amount during the PI control may be changed to the feedback amount derived from the map M2. Moreover, as an example of the change, a feedback amount acquired by subtracting a constant value set in advance from the feedback amount during the PI control may newly be employed.

Further, for example, in the case of the P control, the controller 110 may set the feedback amount (Kp) acquired from the proportional component to be smaller than that during the P control. In this case, calculation means of the controller 110 stores a map M3 in which the feedback amount (Kp) for the P control and the unsprung mass acceleration Au are associated with each other, and this map M3 may be used to set a new feedback amount. As an example, a feedback amount corresponding to the detected unsprung mass acceleration Au is derived from the map M3, and the feedback amount during the P control may be changed to the feedback amount derived from the map M3. Moreover, as an example of the change, a feedback amount acquired by subtracting a constant value set in advance from the feedback amount during the P control may newly be employed.

According to the second processing form, in any one of the PID control, the PI control, and the P control, when the condition in Step S102 is satisfied, the controller 110 sets the proportional gain Kp serving as the feedback amount of the motor for the subject wheel to zero. In the second processing form, the effect of reducing the feedback amount may be increased by setting the proportional gain Kp, which has a particularly large influence by its change among the feedback amount, to zero.

For example, when the proportional gain Kp becomes zero in the case of the PID control, the feedback amount is determined only by the integral component and the derivative component, and, as a result, the feedback amount becomes less than that in the PID control. Further, for example, when the proportional gain Kp becomes zero in the case of the PI control, the feedback amount is determined only by the integral component, and, as a result, the feedback amount becomes less than that in the PI control. Moreover, for example, when the proportional gain Kp becomes zero in the P control, the feedback amount itself becomes zero, and, as a result, the current feedback control is no longer carried out. In this case, the controller 110 controls the four motors 11 to 14 only by the above-mentioned feedforward control.

In the third processing form, the controller 110 may set the feedback amount of the motor for the subject wheel to zero. For example, setting may be made so that the actual current value Ia of each phase detected by the current sensor 131 is not transmitted to the calculation means of the controller 110. In the third processing form, the effect of reducing the feedback amount may be acquired by the simple control. In this case, the controller 110 controls the four motors 11 to 14 only by the above-mentioned feedforward control.

In the second and third processing forms, when only the above-mentioned feedforward control is carried out, the controller 110 may calculate the requested torque Tr based on, for example, the detection value transmitted from the information detection part 120, and may output the requested torque Tr to the motor drive parts 111 to 114.

In any of the first to third processing forms, the feedback amount of the motor for the subject wheel decreases, and the effect of the feedback control is suppressed. As a result, a transmission of a vibration to the stator side member (such as the motor housing) of the motor (such as the motor 21) for the subject wheel is suppressed by a reduction in the electrical rigidity. Consequently, a vibration of the vehicle 10 caused by a kickback may be suppressed.

Note that, in the first embodiment, a description is given of the case where when the wheel actually receives a road surface input more than the certain level as in Steps S101 and S102 of FIG. 4, the controller 110 carries out the feedback amount reduction processing in Step S103. On the other hand, the controller 110 may estimate the road surface input to be received by the wheel based on the road surface information (such as presence/absence and size of recesses/protrusions, joints, steps, and the like) on the traveling road surface of the vehicle 10 acquired by an onboard camera or the like mounted on the vehicle 10, and may carry out the feedback amount reduction processing in advance.

It is preferred that the present invention employ the following second to seventh embodiments as modified examples of the above-mentioned first embodiment.

(Second Embodiment)

According to the second embodiment, when at least one of the four wheels 11 to 14 receives a road surface input in a predetermined high frequency band (typically, a frequency band more than 10 Hz), the controller 110 decreases a feedback amount in this high frequency band to be less than that during the feedback control depending on an amplitude (magnitude) of the road surface input received by the subject wheel (such as the wheel 11). In this case, it is preferred that the amplitude of the high frequency band be derived based on a frequency characteristic of this road surface input. For example, a relationship between the amplitude of the road surface input in the high frequency band and the feedback amount may be registered in advance, and when the amplitude of the road surface input in the high frequency band reaches a certain level (for example, when the amplitude is more than a predetermined threshold), the feedback amount in the high frequency band may be set based on this relationship. Alternatively, when the above-mentioned condition is satisfied, the feedback amount in the high frequency band may be set to zero.

As physical means, for example, in an area in which the actual current value Ia of each phase detected by the current sensor 131 for the motor 21 is transmitted to the torque control device 111a, it is preferred to provide a well-known low-pass filter (not shown) which becomes effective when the above-mentioned condition is satisfied. As a result, when the amplitude of the road surface input in the predetermined high frequency band reaches a certain level, a high frequency component of the actual current value Ia supplied to the motor 21 may be attenuated. As a result, the transmission of the vibration to the stator side member (such as the motor housing) of the motor 21 is suppressed. Consequently, the vibration of the vehicle 10 caused by the kickback may be suppressed. In contrast, for a road surface input in a predetermined low frequency band (typically, a frequency band lower than 10 Hz), the road surface input may be absorbed by an ordinary vehicle motion of the vehicle 10. Thus, the vibration of the vehicle 10 caused by the kickback may be suppressed, and, simultaneously, such a phenomenon that the driving force of the motor 21 is not transmitted to the wheel, so-called "driving force interruption," may be prevented.

(Third Embodiment)

According to the third embodiment, after the feedback amount of the motor for the subject wheel is reduced from the first gain to the second gain when the condition in Step S102 is satisfied as in the first and second embodiments, when an elapse of a predetermined period is further measured by a timer (not shown) or the like, the controller 110 returns the feedback amount from the second gain to the first gain (returning to the feedback amount before the reduction). For example, after the processing in Step S103 of FIG. 4, a step of determining whether the predetermined period has elapsed or not and a step of returning the feedback amount to the feedback amount before the reduction may be added provided that the predetermined period has elapsed. In this case, typically, it is preferred that the predetermined period relating to the reduction in the feedback amount be such a short period (such as 0.1 to 0.3 [s]) that does not affect the vehicle motions (such as the acceleration in the longitudinal direction of the vehicle 10, the acceleration in the lateral direction, and the yaw rate). As a result, while the vibration of the vehicle 10 caused by the kickback is suppressed, the driving force of the wheel may be prevented from varying by the reduction in the feedback amount to affect the vehicle motion.

(Fourth Embodiment)

According to the fourth embodiment, when the controller 110 returns the feedback amount of the motor for the subject wheel to the feedback amount before the reduction as in the third embodiment, the controller 100 gently carries out the return operation.

For example, as one processing form, the return operation of the feedback amount may be carried out more gently than the reduction operation of the feedback amount. Specifically, a period t1 required for reducing the feedback amount from the first gain to the second gain and a period t2 required for returning the reduced feedback amount from the second gain to the first gain (returning to the feedback amount before the reduction) are measured by the timer (not shown) or the like. Then, the controller 110 changes the feedback amount so that a relationship t1<t2 is satisfied. As a result, while the effect of reducing the feedback amount may be quickly acquired, the generation of a noise and a vibration may be suppressed, which is caused when the feedback amount is returned to that before the reduction. As another processing form, the period t2 relating to the return operation of the feedback amount may be set in advance, and the return operation of the feedback amount may be carried out based on this set period t2. Further, it is preferred that the period t2 or a sum of the periods t1 and t2 be a short period (such as 0.1 to 0.3 [s]) set in advance. As a result, the driving force of the wheel may be prevented from varying by the reduction in the feedback amount to affect the vehicle motion.

(Fifth Embodiment)

According to the fifth embodiment, the controller 110 compensates for an error amount (deviation amount) of the driving torque generated by the feedback amount reduction processing in any of the first to fourth embodiments by using the motor for the wheel other than the subject wheel relating to the feedback amount reduction processing. In other words, when the feedback amount is reduced on the motor for the wheel that has received a road surface input in the high frequency band such as the motor 21 for the wheel 11, the controller 110 may assign (distribute) an error amount (torque error ΔT) of the driving torque generated by the reduction to the target torque of another motor other than the motor 21. For example, when the torque decreases due to the reduction in the feedback amount, the decreased amount in the torque may be added to the target torque of the another motor, and when the torque increases due to the reduction in the feedback amount, the increased amount in the torque may be subtracted from the target torque of the another motor. Then, the controller 110 performs the feedback control of the another motor by following the newly set target torque. In this case, the error amount of the driving torque is the error (torque error ΔT) relating to a torque precision generated by the reduction in the feedback amount, and, for example, at least one of the three motors 22 to 24 may be allocated to the motor 21. For example, it is preferred that the torque error ΔT of the motor 21 for the wheel 11 be allocated only to the motor 23 incorporated into the wheel 13 directly in the rear of this wheel 11, and be assigned to the target torque of this motor 23. As a result, a change generated in the vehicle motion may be suppressed, thereby reducing a sense of discomfort felt by vehicle occupants.

(Sixth Embodiment)

According to the sixth embodiment, the controller 110 gently carries out the control operation in the fifth embodiment relating to the torque distribution from the motor for the subject wheel to another motor.

For example, as one processing form, the motor control may be carried out so that the control operation relating to the torque distribution to another motor other than, for example, the motor 21 is slower than the reduction operation of the feedback amount on the motor 21. Specifically, the controller 110 controls the motors 21 to 24 so that a period t3 required for reducing the feedback amount on the motor 21 and a period t4 required for assigning the torque error Δt to the target torque of another motor satisfy a relationship t3<t4. As a result, while the effect of reducing the feedback amount may be quickly acquired for the motor 21, the generation of a noise and a vibration caused by a rapid distribution of the torque error ΔT to another motor other than the motor 21 may be suppressed. In this case, a change in the vehicle motion is a variation in a low frequency band, and hence even when the torque error ΔT is not rapidly distributed, the vehicle motions are not affected. As another processing form, the period t4 relating to the torque distribution to another motor may be set in advance. Moreover, as physical means, a well-known rate limit (not shown) effective for reducing a response speed may be provided in an area for connecting the controller 110 and the motor drive part of another motor other than, for example, the motor 21 with each other.

(Seventh Embodiment)

According to the seventh embodiment, when the above-mentioned torque error ΔT relating to the motor (such as the motor 21) for the subject wheel is distributed to another motor as in the fifth or sixth embodiment, the controller 110 extracts a predetermined low frequency component of the torque error ΔT, and distributes this low frequency component to the another motor. In other words, the predetermined low frequency component of the torque error ΔT is assigned to the target torque of the another motor. In this case, as physical means, a well-known low pass filter (not shown) that may attenuate a high frequency component of the torque error ΔT and simultaneously extract the low frequency component may be used. As a result, while the effect of reducing the feedback amount may be quickly acquired for the motor 21, the generation of the noise and the vibration caused by the rapid distribution of the torque error ΔT to the another motor other than the motor 21 may be suppressed. In this case, a change in the vehicle motion is a variation in the low frequency band, and hence the high frequency component of the torque error ΔT does not need to be distributed.

Figure 5:
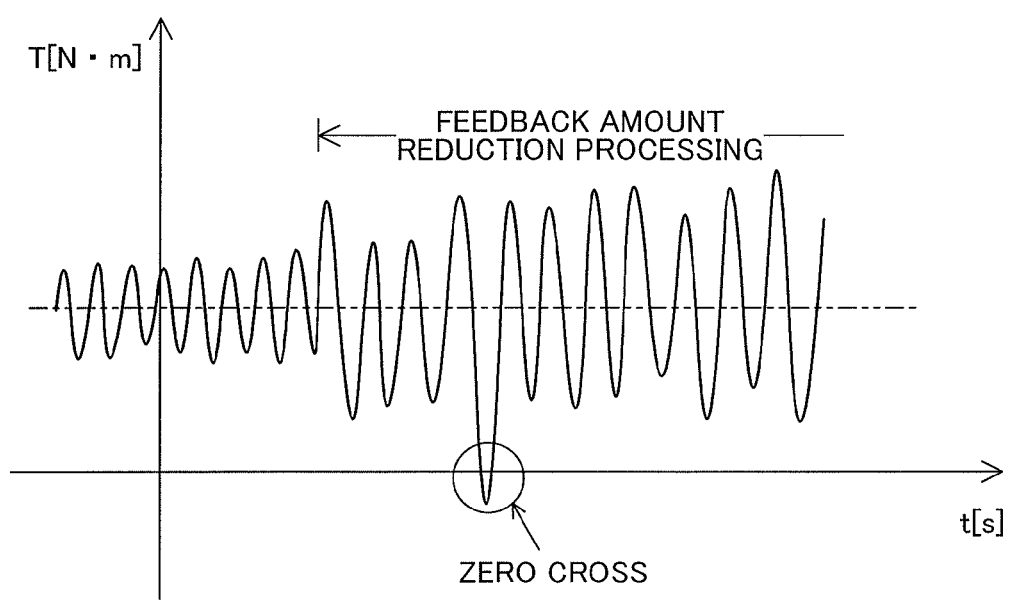
FIG. 5 is a graph showing a state of a torque variation during the feedback suppression control of FIG. 4.
Figure 6:
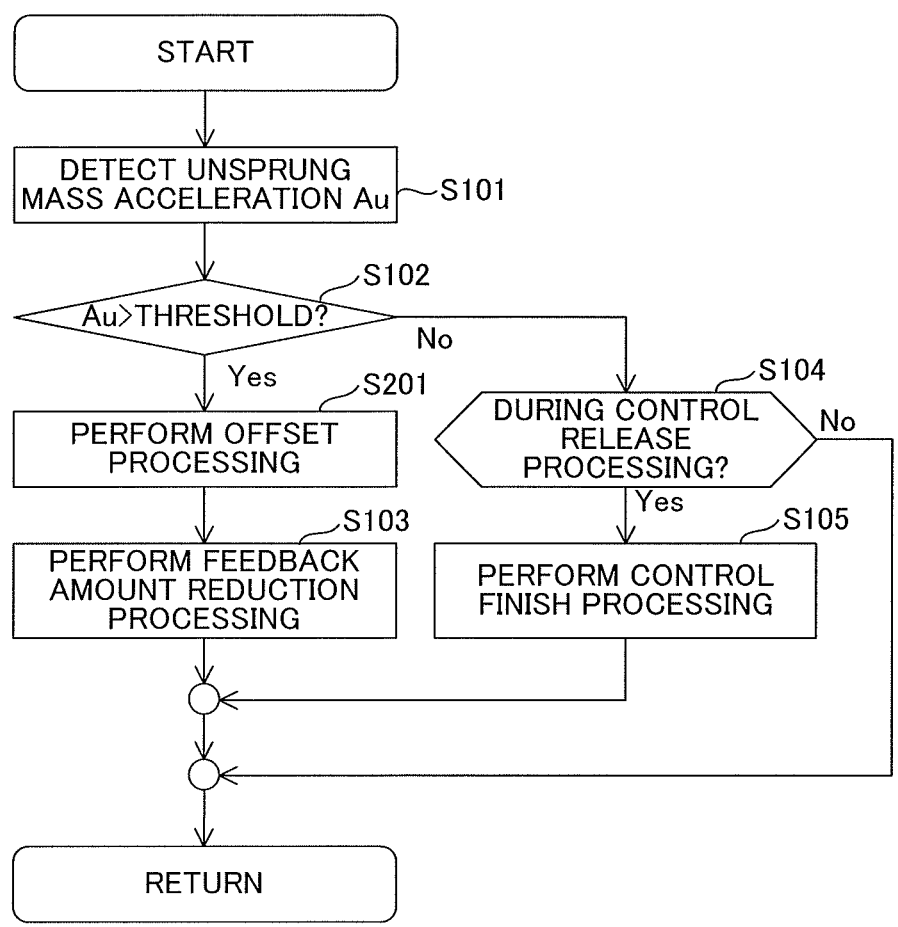
FIG. 6 is a flowchart illustrating a processing flow of control including offset processing, which is a modified example of the feedback suppression control of FIG. 4.

On this occasion, when the wheel receives a road surface input more than the certain level and the feedback amount reduction processing is thus carried out in the above-mentioned feedback suppression control, the effect of the feedback control is reduced. Thus, a case where the variation in the driving torque of the motor for this wheel (such as the motor 21 for the wheel 11) increases is assumed. In this case, for example, the driving torque T [N·m] of the motor 21 transitions as shown in FIG. 5 as the time t [s] elapses, and such a phenomenon that the sign of the driving torque T is inverted (so-called "zero cross") occurs. Particularly, as illustrated in FIG. 2, in the configuration in which the speed reducer 31 is provided between the wheel 11 and the motor 21, the generation of the zero cross may be responsible for generation of a rattle and a vibration in the speed reducer 31. Thus, according to the present invention, in order to handle this problem, for example, it is preferred to employ an embodiment (eighth embodiment) of carrying out feedback suppression control of FIG. 6.

(Eighth Embodiment)

Figure 7:
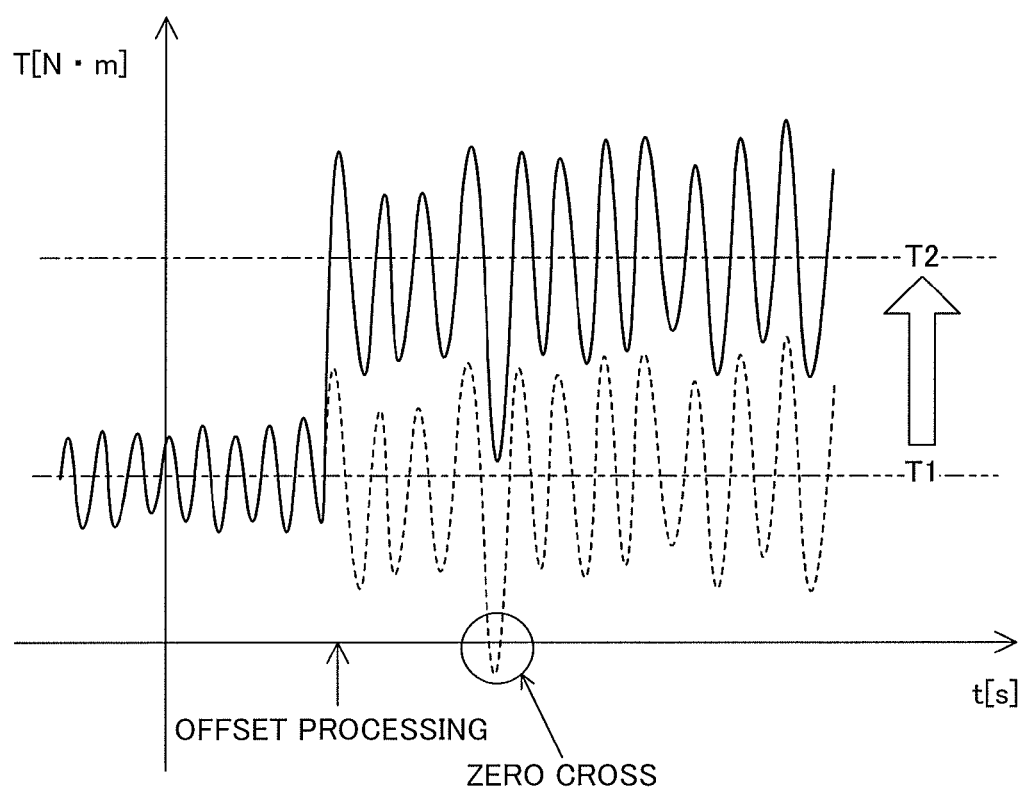
FIG. 7 is a graph showing a state of the torque variation in an offset state set by the offset processing of FIG. 6.

According to the eighth embodiment, offset processing in Step S201 is provided between the processing in Step S102 and the processing in Step S103 of the feedback suppression control of FIG. 4 in any one of the first to seventh embodiments. In this offset processing, as shown in FIG. 7, when the controller 110 detects a road surface input equal to or more than a certain level, the controller 110 changes the target torque relating to a motor for a wheel that has received the road surface input (such as the motor 21 for the wheel 11). Specifically, as shown in FIG. 7, the controller 110 outputs to the torque control device 111a such a command as to less likely cause a zero cross of the driving torque, namely, a torque setting command to increase the target torque from T1 [N·m] to T2 [N·m]. As a result, in the subsequent feedback amount reduction processing (processing in Step S103 of FIG. 6), the control of following the target torque T2 [N·m] is carried out, for example, on the motor 21. Thus, even when the actual driving torque varies due to the feedback amount reduction processing, the fear of the inversion of the sign of the driving torque (generation of the zero cross) decreases, and, as a result, the generation of the rattle and the vibration in the speed reducer 31 may be suppressed.

Note that, in the offset processing in Step S201, any one of the following three processing forms (first to third processing forms) may be selectively employed.

In the first processing form, the controller 110 may change an offset amount of the target torque depending on the magnitude of the road surface input received by the wheel, namely, depending on the unsprung mass acceleration Au detected by the acceleration sensor 130. Specifically, the target torque T2 [N·m] is set so that the difference from the target torque T1 [N·m] becomes larger as the unsprung mass acceleration Au becomes larger. Accordingly, even when the road surface input received by the wheel is relatively large, and the variation of the driving torque increases as a result of a corresponding increase in the reduction amount of the feedback amount, the above-mentioned zero cross is less likely generated.

In the second processing form, the controller 110 estimates the road surface input received by the wheel, thereby carrying out the offset processing in advance. For example, the controller 110 acquires road surface information (such as presence/absence and size of recesses/protrusions, joints, steps, and the like) on the traveling road surface of the vehicle 10 via road surface information acquisition means such as an onboard camera, a navigation device, or the like installed on the vehicle 10. Then, the controller 110 determines whether or not the wheel 11 or 12, which is the front wheel, possibly receives a road surface input equal to or more than a certain level based on the information acquired by this road surface information acquisition means. In this case, the road surface information on the traveling road surface immediately before the vehicle 10 arrives may be acquired by the onboard camera or the navigation device of the vehicle 10. Moreover, road surface information registered based on a past travel history of the vehicle 10 and other vehicles may be acquired by the navigation device of the vehicle 10. When the controller 110 determines that the wheel 11 or 12 possibly receives a road surface input equal to or more than the certain level, the controller 110 carries out the offset processing (processing of increasing the target torque from T1 [N·m] to T2 [N·m]) on the motor 21 for the wheel 11 or the motor 22 for the wheel 12 before the wheel actually receives the road surface input. As a result, the motor for the front wheel may be appropriately controlled without a delay. Thus, the road surface input received by the front wheel may be quickly handled.

In the third processing form, the controller 110 carries out the offset processing for the rear wheel. For example, when the controller 110 uses the acceleration sensor 130 and detects that the wheel 11 or 12, which is the front wheel, has received a road surface input equal to or more than the certain level, the controller 110 estimates a timing at which the wheel 13 or 14, which is the rear wheel, subsequently receives the road surface input. Specifically, the controller 110 calculates a period Δt from a time point when the front wheel passes the traveling road surface relating to the road surface input to a time point when the rear wheel passes this traveling road surface, for example, based on the vehicle speed and a wheelbase (a distance between a front axle and a rear axle) of the vehicle 10. In this case, it is preferred that the controller 110 acquire the vehicle speed of the vehicle 10 from the information detection part 120, and store the wheelbase in advance. Then, the controller 110 applies the above-mentioned offset processing (processing of increasing the target torque from T1 [N·m] to T2 [N·m]) to the motor 23 for the wheel 13 or the motor 24 for the wheel 14 before the calculated period Δt elapses. In this case, the acceleration sensor 130 serves as estimation means for estimating the timing for applying the above-mentioned offset processing to the motor for the rear wheel. On the other hand, when the above-mentioned road surface information acquisition means is employed, this estimation means may be omitted.

As a result, the motor for the rear wheel may be appropriately controlled without a delay.

The above-mentioned offset processing may be carried out for the motors for both the front and rear wheels, or may be carried out for the motors for only the rear wheels.

It is preferred that the present invention employ the following ninth to thirteenth embodiments as modified examples of the eighth embodiment.

(Ninth Embodiment)

According to the ninth embodiment, when the controller 110 carries out the above-mentioned offset processing on the motor for the subject wheel in the eighth embodiment, the controller 110 may carry out the motor control so that a driving torque does not change on the four motors as a whole in order to suppress variations in the vehicle motions (such as the acceleration in the longitudinal direction and the yaw rate of the vehicle 10) and the travel speed. Specifically, the controller 110 carries out torque redistribution processing of assigning a torque change amount of the target torque of the motor for the subject wheel to the target torque of the another motor, thereby redistributing the driving torque. In other words, the torque change amount of the predetermined motor is compensated for by the another motor. For example, when the target torque of the predetermined motor is offset toward an increase direction (offset toward a plus side), the torque change amount relating to the offset may be subtracted from the target torque of the another motor, and when the target torque of the predetermined motor is offset toward a decrease direction (offset toward a minus side), the torque change amount relating to the offset may be added to the target torque of the another motor. For example, when the driving torque is redistributed among the four motors 21 to 24, an increase amount (offset amount) in the target torque of the motor 21 is set so as to match a sum of decrease amounts (offset amounts) in the respective target torques of the three motors 22, 23, and 24. Then, the controller 110 performs the feedback control of the another motor by following the target torque after the assignment. As a result, the variations in the vehicle motions and the travel speed of the vehicle 10 may be suppressed.

Note that, in order to prevent the above-mentioned zero cross from being caused by this torque redistribution processing during the feedback control of the another motor, it is preferred that a threshold be set in order to limit the change in the target torque of the another motor. Then, when the target torques of the another motor violate this threshold, the target torque of the motor for the subject wheel is reconsidered, and the offset amount itself of the target torque is corrected so as to be suppressed. For example, the target torque of the motor 21 may be set again to a value lower than T2 [N·m]. As a result, a noise is prevented from being generated from the wheel other than the wheel that has received the road surface input. In this case, the zero cross may be generated on this motor 21 because of the decrease in the target torque of the motor 21, and a noise and a vibration may be generated on the wheel 11. However, the wheel 11 is the wheel that has originally received the road surface input, and hence the generation of the noise and the vibration on this wheel 11 causes a less sense of discomfort felt by vehicle occupants.

(Tenth Embodiment)

Figure 8:
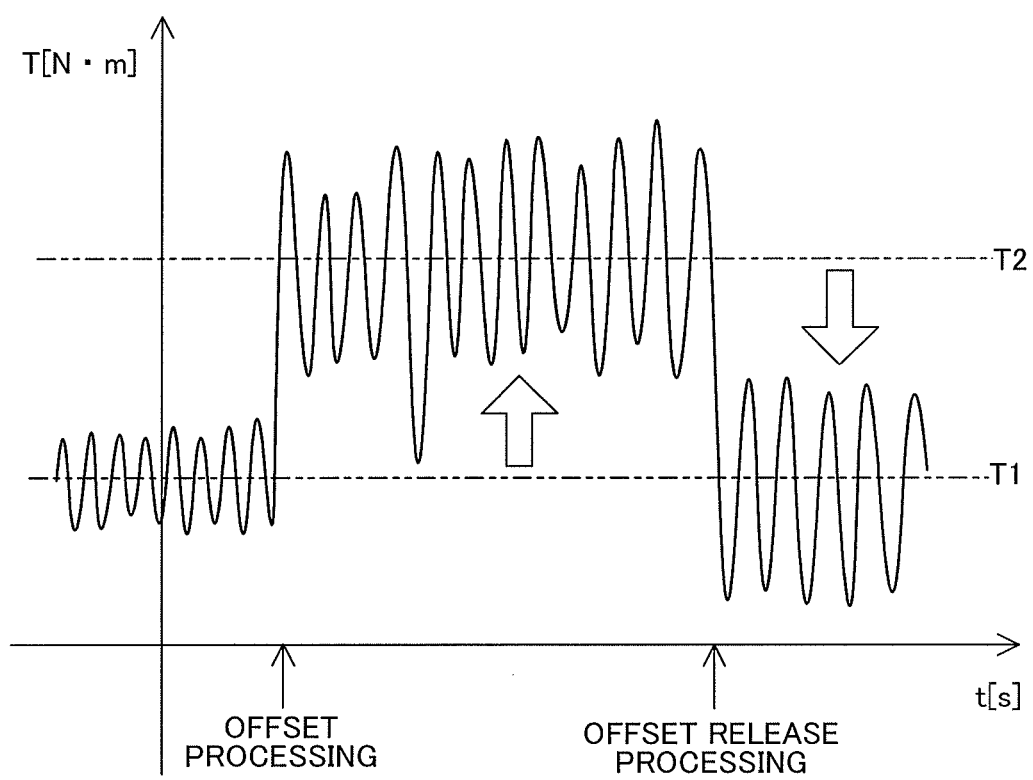
FIG. 8 is a graph showing a state of the torque variation, which is caused when offset release processing is carried out in the offset state of FIG. 7.

According to the tenth embodiment, the controller 110 sets a holding period (also referred to as "continuation period") $\Delta t1$ of holding the offset state in which the above-mentioned offset processing is being carried out in the eighth or ninth embodiment. The holding period $\Delta t1$ is derived as a period (above-mentioned period $\Delta t$) after the front wheel receives a road surface input equal to or more than a certain level until the rear wheel receives this road surface input. As a result, the offset state continues after the front wheel passes a traveling road surface relating to the road surface input until the rear wheel passes this traveling road surface, and the control of the rear wheel is thus prevented from being delayed. In this case, it is preferred that, when at least the holding period $\Delta t1$ has elapsed, the controller 110 carry out the offset release processing of quickly releasing the offset state to return to the state before the offset processing. As shown in FIG. 8, for example, after the target torque for the motor 21 is changed from T1 [N·m] to T2 [N·m], when the holding period $\Delta t1$ has elapsed, the target torque may again be returned from T2 [N·m] to T1 [N·m]. As a result, the use of the unnecessary driving torque (consumption of unnecessary energy) is prevented by suppressing the period during which the offset state is maintained.

(Eleventh Embodiment)

According to the eleventh embodiment, in the above-mentioned offset processing in the ninth embodiment, when a torque in the driving direction is generated on any one of the front wheels and the rear wheels and a torque in the braking direction (direction opposite to the driving direction) is generated on the other one of the front wheels and the rear wheels to form an equilibrium state, the controller 110 holds this equilibrium state for a certain period. The appropriate offset processing in a stable state balanced between the plus side and the minus side in terms of the torque is enabled by holding this equilibrium state until a holding period $\Delta t2$ elapses. Note that, it is preferred that, when a road surface input equal to or more than a certain level is estimated to be input to the front wheel, the controller 110 carry out the motor control so as to form the above-mentioned equilibrium state. As a result, a delay in the control may be prevented. Moreover, the above-mentioned holding period $\Delta t2$ may be a value set in advance, or may be changed depending on the vehicle speed of the vehicle 10.

As a specific example of changing the holding period $\Delta t2$, when the vehicle speed of the vehicle 10 is relatively low, the holding period $\Delta t2$ may be set to be relatively long, and when the vehicle speed of the vehicle 10 is relatively high, the holding period $\Delta t2$ may be set to be relatively short. This is because as the vehicle speed decreases, a longer period is required for passing the traveling road surface relating to a road surface input equal to or more than the certain level, and the holding period $\Delta t2$ thus needs to be longer. The holding period $\Delta t2$ to be actually selected may be calculated from a correlation equation between the vehicle speed of the vehicle 10 and the holding period $\Delta t2$ prepared in advance. When the holding period $\Delta t2$ is set depending on the vehicle speed of the vehicle 10, an unnecessary driving torque is prevented from being used as a result of the continuation of the offset state.

(Twelfth Embodiment)

According to the twelfth embodiment, the controller 110 may carry out the motor control so that a period $\Delta t4$ required for the above-mentioned torque redistribution processing is more than a period $\Delta t3$ required for the above-mentioned offset processing in the ninth embodiment. In this case, the period $\Delta t4$ corresponds to a period required for assigning the torque change amount to the target torque of another motor. For this purpose, it is preferred to use a well-known rate limit, low pass filter, or the like effective for reducing the response speed. As a result, while the noise and the vibration caused by the zero cross on the subject wheel relating to the road surface input are suppressed, the noise and the vibration caused by the rapid torque redistribution processing may be suppressed. In this case, a change in vehicle motion is a variation in the low frequency band, and hence even when the torque redistribution processing is not rapidly carried out, the vehicle motions are not affected.

(Thirteenth Embodiment)

According to the thirteenth embodiment, after the control state in which the above-mentioned offset processing and the above-mentioned torque redistribution processing are carried out in the twelfth embodiment, this control state is released so as to return to the initial state (also referred to as "normal state"). In this case, it is preferred that the controller 110 carry out the motor control so that a period $\Delta t6$ required for returning the control state to the initial state is more than a period $\Delta t5$ ($=\Delta t3+\Delta t4$) required for transition from the initial state to the control state. As a result, a noise and a vibration, which are caused when the control state returns to the initial state may be suppressed.

Based on the above-mentioned embodiments and various modified examples, the present invention may take the following respective aspects.

A wheel control method could include determining a wheel for which an unsprung mass acceleration more than a threshold set in advance is detected among the plurality of wheels as the subject wheel.

A wheel control method could include determining a wheel for which a rotational variation more than a threshold set in advance is detected among the plurality of wheels as the subject wheel.

A wheel control method could include changing the feedback amount from a first gain to a second gain that is less than the first gain in order to reduce the feedback amount relating to the feedback control to be less than the feedback amount before the subject wheel receives the road surface input.

A wheel control method could include setting a proportional gain serving as the second gain to zero.

A wheel control method could include setting the second gain to zero.

A wheel control method could include returning, after the feedback amount relating to the feedback control is changed from the first gain to the second gain, the feedback amount from the second gain to the first gain again after a predetermined period has elapsed.

A wheel control method could include carrying out motor control so that a period required for returning the feedback amount from the second gain to the first gain is more than a period required for changing the feedback amount from the first gain to the second gain.

A wheel control method could include reducing, in order to reduce the feedback amount relating to the feedback control to be less than the feedback amount before the subject wheel receives the road surface input, a feedback amount in a predetermined high frequency band out of the feedback amount depending on an amplitude of the road surface input.

A wheel control method could include assigning a torque error amount generated by the reduction in the feedback amount to a target torque of another motor other than the motor relating to the reduction, and performing feedback control of the another motor depending on the target torque after the assignment.

A wheel control method could include carrying out motor control so that a period required for assigning the torque error amount to the target torque of the another motor is more than a period required for reducing the feedback amount.

A wheel control method in which the torque error is a predetermined low frequency component of the driving torque generated by the reduction in the feedback amount.

A wheel control method could include further including offsetting the target torque so as to increase a difference between the target torque and a torque zero area in which a sign of the driving torque of the motor is inverted before the reduction in the feedback amount relating to the feedback control.

A wheel control method could include assigning a torque change amount generated by the offset of the target torque to a target torque of another motor other than the motor relating to the offset, and performing feedback control of the another motor depending on the target torque after the assignment.

A wheel control method could include setting a period from a passage of a front wheel among the plurality of wheels on a traveling road surface relating to the road surface input to a passage of a rear wheel to be a holding period for holding the offset.

A wheel control method could include holding, when the offset causes an equilibrium state in which a torque in a driving direction is generated on one of a front wheel and a rear wheel among the plurality of wheels and a torque in a braking direction opposite to the driving direction is generated on another one of the front wheel and the rear wheel, the equilibrium state for a certain period.

A wheel control method could include carrying out motor control so that a period required for assigning the torque change amount to the target torque of the another motor is more than a period required for the offset.

A wheel control method could include carrying out, when a control state in which the feedback control is performed on the another motor depending on the target torque after the assignment of the torque change amount is formed from an initial state after the offset and when the control state is returned to the initial state, motor control so that a period required for a transition from the control state to the initial state is more than a period required for a transition from the initial state to the control state.

The invention claimed is:

1. A wheel control device configured to control a plurality of wheels mounted on a vehicle, the wheel control device comprising:
    a control part configured to perform feedback control of a motor, which is mounted to each of the plurality of wheels in order to drive the each of the plurality of wheels, so that a driving torque of the motor follows a target torque,
    wherein the control part changes, for a motor driving a subject wheel that has received an unsprung mass acceleration larger than a predetermined threshold unsprung mass acceleration among the plurality of wheels, in order to reduce a feedback amount relating to the feedback control to be less than a feedback amount before the subject wheel receives the road surface input, the feedback amount from a first gain to a second gain that is less than the first gain, and returns the feedback amount from the second gain to the first gain again after a predetermined period has elapsed.

2. A wheel control device according to claim 1, wherein the control part carries out motor control so that a period required for returning the feedback amount from the second gain to the first gain is more than a period required for changing the feedback amount from the first gain to the second gain.

3. A wheel control device according to claim 1, further comprising an information detection part capable of detecting variation information when each of the plurality of wheels receives the road surface input,
   wherein the control part identifies the subject wheel based on the variation information detected by the information detection part, and, when the subject wheel receives the road surface input, reduces the feedback amount relating to the feedback control to be less than the feedback amount before the subject wheel receives the road surface input.

4. A wheel control device according to claim 3, wherein:
   the information detection part comprises an acceleration sensor mounted to each of the plurality of wheels in order to detect an unsprung mass acceleration acting on an unsprung mass area of the vehicle; and
   the control part determines a wheel for which an unsprung mass acceleration more than a threshold set in advance is detected by the acceleration sensor as the subject wheel.

5. A wheel control device according to claim 3, wherein:
   the information detection part comprises a motor rotation sensor configured to detect a rotational variation of the motor; and
   the control part determines a wheel corresponding to a motor for which the rotational variation more than a threshold set in advance is detected by the motor rotation sensor as the subject wheel.

6. A wheel control device according to claim 1, wherein a proportional gain serving as the second gain is zero.

7. A wheel control device according to claim 1, wherein the second gain is zero.

8. A wheel control device according to claim 1, wherein the control part assigns a torque error amount generated by the reduction in the feedback amount to a target torque of another motor other than the motor relating to the reduction, and performs feedback control of the another motor depending on the target torque after the assignment.

9. A wheel control device according to claim 8, wherein the control part carries out motor control so that a period required for assigning the torque error amount to the target torque of the another motor is more than a period required for reducing the feedback amount.

10. A wheel control device according to claim 8, wherein the torque error comprises a predetermined low frequency component of the driving torque generated by the reduction in the feedback amount.

11. A wheel control device according to claim 1, wherein the control part offsets the target torque so as to increase a difference between the target torque and a torque zero area in which a sign of the driving torque of the motor is inverted before the reduction in the feedback amount relating to the feedback control.

12. A wheel control device according to claim 11, wherein the control part assigns a torque change amount generated by the offset of the target torque to a target torque of another motor other than the motor relating to the offset, and performs feedback control of the another motor depending on the target torque after the assignment.

13. A wheel control device according to claim 11, wherein the control part sets a period from a passage of a front wheel among the plurality of wheels on a traveling road surface relating to the road surface input to a passage of a rear wheel to be a holding period for holding the offset.

14. A wheel control device according to claim 12, wherein, when the offset causes an equilibrium state in which a torque in a driving direction is generated on any one of a front wheel and a rear wheel among the plurality of wheels and a torque in a braking direction opposite to the driving direction is generated on another one of the front wheel and the rear wheel, the control part holds the equilibrium state for a certain period.

15. A wheel control device according to claim 12, wherein the control part carries out motor control so that a period required for assigning the torque change amount to the target torque of the another motor is more than a period required for the offset.

16. A wheel control device according to claim 15, wherein, when a control state in which the feedback control is performed on the another motor depending on the target torque after the assignment of the torque change amount is formed from an initial state after the offset and when the control state is returned to the initial state, the control part carries out motor control so that a period required for a transition from the control state to the initial state is more than a period required for a transition from the initial state to the control state.

17. A vehicle, comprising:
   a plurality of wheels;
   a motor mounted to each of the plurality of wheels in order to drive the each of the plurality of wheels; and
   a control device configured to control the motor,
   wherein the control device comprises the wheel control device of claim 1.

18. A wheel control method for controlling a plurality of wheels mounted on a vehicle, comprising:
   performing feedback control to a motor, which is mounted to each of the plurality of wheels in order to drive the each of the plurality of wheels, so that a driving torque of the motor follows a target torque; and
   changing, for a motor driving a subject wheel that has received an unsprung mass acceleration larger than a predetermined threshold unsprung mass acceleration among the plurality of wheels, in order to reduce a feedback amount relating to the feedback control to be less than a feedback amount before the subject wheel receives the road surface input, the feedback amount from a first gain to a second gain that is less than the first gain, and returning the feedback amount from the second gain to the first gain again after a predetermined period has elapsed.

19. A wheel control method according to claim 18, further comprising:
   detecting variation information when each of the plurality of wheels receives the road surface input;
   identifying the subject wheel based on the detected variation information; and
   reducing, when the subject wheel receives the road surface input, the feedback amount relating to the feedback control to be less than the feedback amount before the subject wheel receives the road surface input.

* * * * *